United States Patent
Blaak

Patent Number: 5,783,096
Date of Patent: Jul. 21, 1998

[54] METHOD FOR TREATING WASH WATER ORIGINATING FROM THE WASHING OF SUGAR BEETS

[75] Inventor: Leendert Jakob Blaak, Zevenhuizen, Netherlands

[73] Assignee: Linatex (Nederland) B.V., en Rodenrijs, Netherlands

[21] Appl. No.: 573,417

[22] Filed: Dec. 15, 1995

[30] Foreign Application Priority Data

Dec. 15, 1994 [NL] Netherlands ............ 9402130

[51] Int. Cl.$^6$ .................... B01D 21/26
[52] U.S. Cl. ............ 210/806; 210/788; 209/725; 209/729; 209/17; 127/42
[58] Field of Search ............ 127/42; 210/787, 210/788, 806; 209/725, 728, 729, 17

[56] References Cited

U.S. PATENT DOCUMENTS

| | | | |
|---|---|---|---|
| 4,863,617 | 9/1989 | Katoh et al. | 210/788 |
| 5,185,087 | 2/1993 | Lister et al. | 210/806 |
| 5,593,600 | 1/1997 | Solomon | 210/806 |

FOREIGN PATENT DOCUMENTS

| | | |
|---|---|---|
| 0142821 | 11/1984 | Germany. |
| 3840447 | 12/1988 | Germany. |
| 9301877 | 2/1993 | WIPO. |

*Primary Examiner*—David A. Reifsnyder
*Attorney, Agent, or Firm*—Michael D. Bednarek; Kilpatrick Stockton LLP

[57] ABSTRACT

A description is given of a method for treating wash water originating from the washing of sugar beets. This wash water essentially comprises water, sand, sludge and sugar beet particles. The wash water is subjected to a treatment in a cyclone, in which the sand is separated from the wash water, followed by a screen treatment, in which the sugar beet particles are separated from the wash water.

3 Claims, 1 Drawing Sheet

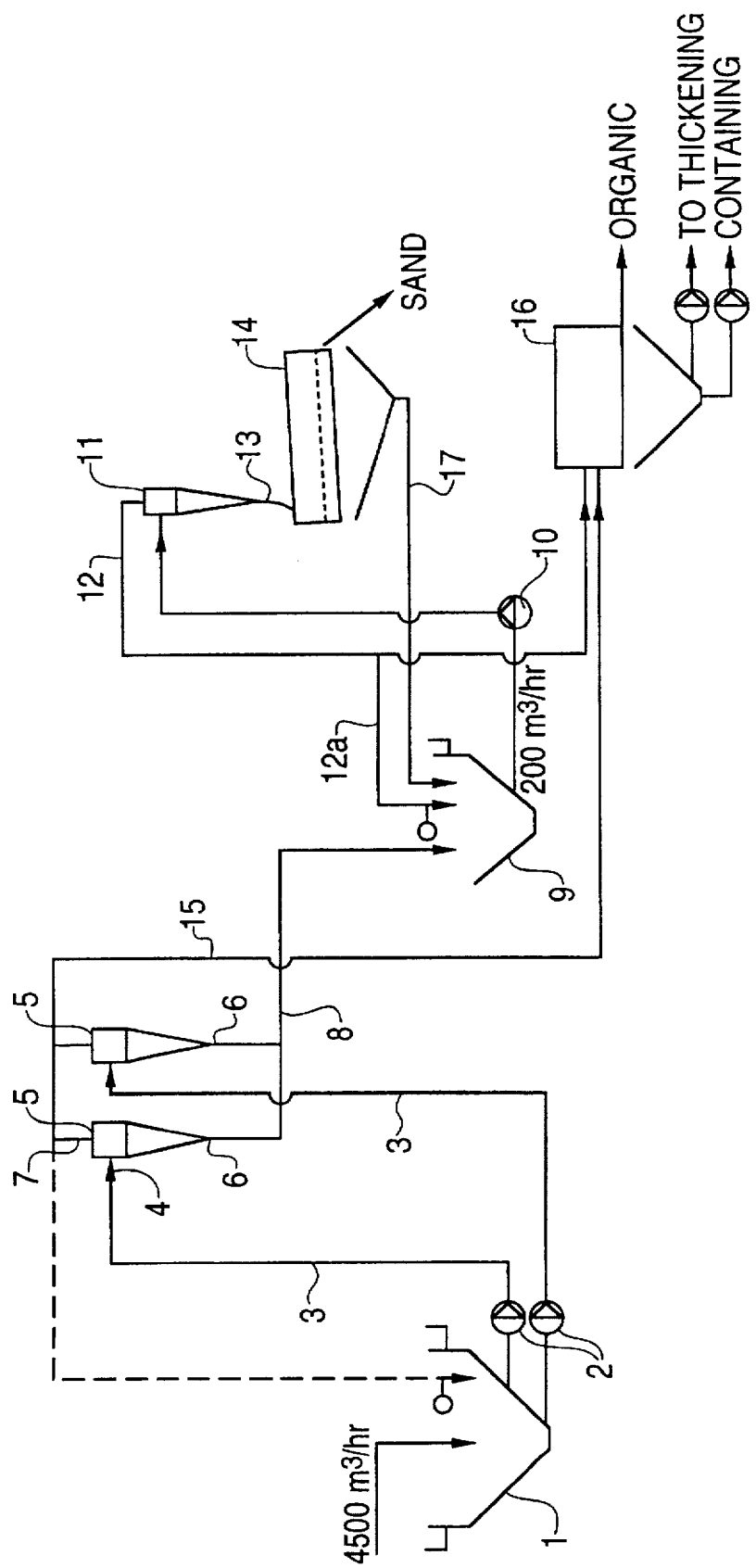

METHOD FOR TREATING WASH WATER ORIGINATING FROM THE WASHING OF SUGAR BEETS

BACKGROUND OF THE INVENTION

The present invention relates to a method for treating wash water originating from the washing of sugar beets and essentially comprising water, sand, sludge and sugar beet particles.

A method of this kind is usually performed by leading the wash water, comprising water, sand, sludge and organic material, essentially in the form of sugar beet particles, to a so-called "settling pond", where the solid particles in the wash water will settle down. A drawback of this method is that the presence of organic material in the wash water will lead to the formation of an unpleasant odour in the settling pond.

Another known method for treating the wash water is to conduct the wash water through a drum screen, so that the sand and part of the organic material are separated from the rest of wash water. A drawback of this method is that the organic material which is thus separated contains too much sand and pebbles, thereby making it unsuitable or less suitable for further processing. In addition, fine screening cannot be carried out with the known method, since the screen rapidly becomes blocked with sand. A further drawback of the method is that the presence of sand will result in rapid wearing of the screen.

SUMMARY OF THE INVENTION

The object of the present invention is to overcome the above-mentioned drawbacks and, to this end, the present invention is characterized in that the wash water is subjected to a treatment in a cyclone, in which the sand is separated from the wash water, followed by a screen treatment, in which the sugar beet particles are separated from the wash water.

Thus, in a first stage the relatively heavy sand is separated from the relatively light sugar beet particles and water, with the aid of a cyclone, in which separation is realized on the basis of specific gravity. In a subsequent stage, the wash water, which then essentially comprises sugar beet particles and water, is subjected to a screen treatment, in which separation is realized on the basis of particle size and in which the sugar beet particles are separated from the water. The water, in which a certain quantity of sludge is generally still present, will then be led to the settling pond to enable the sludge to settle down.

The method according to the present invention therefore has the advantage that there is scarcely any organic material, such as sugar beet particles, present in the settling pond, so that neither will any stench develop in the settling pond. Moreover, there is no longer any sand present during the screen treatment of the wash water, so that the screen will not rapidly become blocked and wearing of the screen is considerably less than in the known method.

In a particular embodiment, the separated sand is subjected to a treatment in a cyclone, in which any remaining residues of sugar beet particles are removed from the sand.

As a result of this treatment, a cleaned and reusable sand is obtained.

The present invention also relates to a method for obtaining sugar from sugar beets, at least comprising the steps involving washing of the sugar beets with water, cutting the beets and extracting said beets, filtering-off the shred, adding additives to the sap which is obtained after extraction, concentrating the sap, introducing crystal nuclei and crystallizing the pulp, separating the crystallized sugar from the liquid and drying the sugar. This method is characterized in that the water which is used for the washing of the sugar beets is subjected to a treatment in a cyclone, in which the sand is separated from the wash water, followed by a screen treatment, in which sugar beet particles are separated from the wash water.

Advantageously, the sugar beet particles separated from the wash water are led through to the extraction phase. Thus the sugar beet particles from the wash water are used for the recovery of sugar, which can mean a three per cent higher sugar yield.

Finally, the present invention relates to a device which is suitable for the performance of the above-described method. This device is characterized in that it comprises a cyclone having an inlet for the wash water to be treated and an outlet for sand on the bottom side and an outlet for sugar beet particles and water on the top side, which outlet is connected to a drum screen for the separation of sugar beet particles and water.

BRIEF DESCRIPTION OF THE DRAWINGS

The present invention is to be explained in greater detail below with reference to the appended drawing, which is a schematic representation of a system for treating wash water originating from washing sugar beets.

In the drawing, reference numeral 1 denotes a trough into which wash water originating from the washing of sugar beets is conducted. This wash water essentially comprises water, sand and sugar beet particles. Usually, the wash water additionally includes a certain quantity of sludge consisting of very fine particles. With the aid of the pumps 2, the wash water is conducted through one of the pipes 3 to the inlet 4 of one of the cyclones 5. In the cyclones 5, a separation of the wash water is realized on the basis of specific gravity. The relatively heavy sand leaves the cyclone 5 via the bottom outlet 6, whilst the water containing the sugar beet particles and any sludge present leaves the cyclone 5 via the overflow 7. In the drawing, a dashed line indicates that the overflow or a portion thereof might possibly be returned to the trough 1 to be re-subjected to the separation treatment.

The wet sand which has left the cyclone 5 via the bottom outlet 6 is conducted through the pipe 8 into a trough 9. With the aid of the pump 10, this sand is led to a cyclone 11, where again a separation takes place on the basis of specific gravity and any last remaining residues of organic material (in particular sugar beet particles) are separated from the sand. The sugar beet particles which are present leave the cyclone 11 via the overflow and pipe 12. Via the pipe 12a, a portion of these sugar beet particles can be returned to the trough 9. The sand leaves the cyclone 11 via the bottom outlet 13 and is subsequently subjected to a screen treatment by a flat screen 14 to remove water therefrom. Following this screen treatment, sand is obtained which is suitable for reuse. The water which has been separated from the sand can be returned to the trough 9 via the pipe 17.

The wash water which has left the cyclone 5 via the overflow 7 is led through a pipe 15 to a drum screen 16. The sugar beet particles from the cyclone 11 are led through the pipe 12 likewise to this drum screen 16. With the aid of this drum screen 16, sugar beet particles are separated from the mixture of water, sugar beet particles and any sludge which is present. These sugar beet particles can be used for the recovery of sugar or for beet-pulp production. For the recovery of sugar, the sugar beet particles are led into the extraction phase in the sugar-recovery process and the particles, together with the cut sugar beets which are already present, can be subjected to extraction. The sugar beet particles can, however, also be used as feed.

The water, together with any sludge present therein, which leaves the drum screen 16 is led to a settling pond where the sludge can settle down. Since there is no longer any organic material present in this water, the problem of odour nuisance is prevented.

What is claimed is:

1. A method for treating wash water originating from washing sugar beets, said wash water comprising water, sand, sludge and sugar beet particles, wherein the wash water is subjected to a treatment in a first cyclone, in which wet sand containing a residue of sugar beet particles is separated from the wash water on the basis of specific gravity, followed by a first screen treatment, in which the sugar beet particles are separated from the wash water on the basis of particle size, and followed by a settling of the sludge still present in the wash water.

2. A method according to claim 1, wherein the wet sand containing a residue of sugar beet particles separated in the first cyclone is subjected to a treatment in a second cyclone, in which said residue of sugar beet particles is removed from the wet sand on the basis of specific gravity.

3. A method according to claim 1, wherein the wet sand containing a residue of sugar beet particles separated in the first cyclone is subjected to a treatment in a second cyclone, in which said residue of sugar beet particles is removed from the wet sand on the basis of specific gravity, and wherein the wet sand separated in the second cyclone is subjected to a second screen treatment to remove water from said sand.

* * * * *